Figure 8:
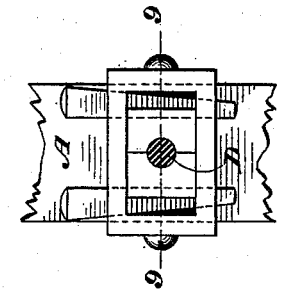

11 Sheets—Sheet 1.
P. PLANT.
Process and Apparatus for Separating Precious Metals from their Ores.
No. 215,291. Patented May 13, 1879.
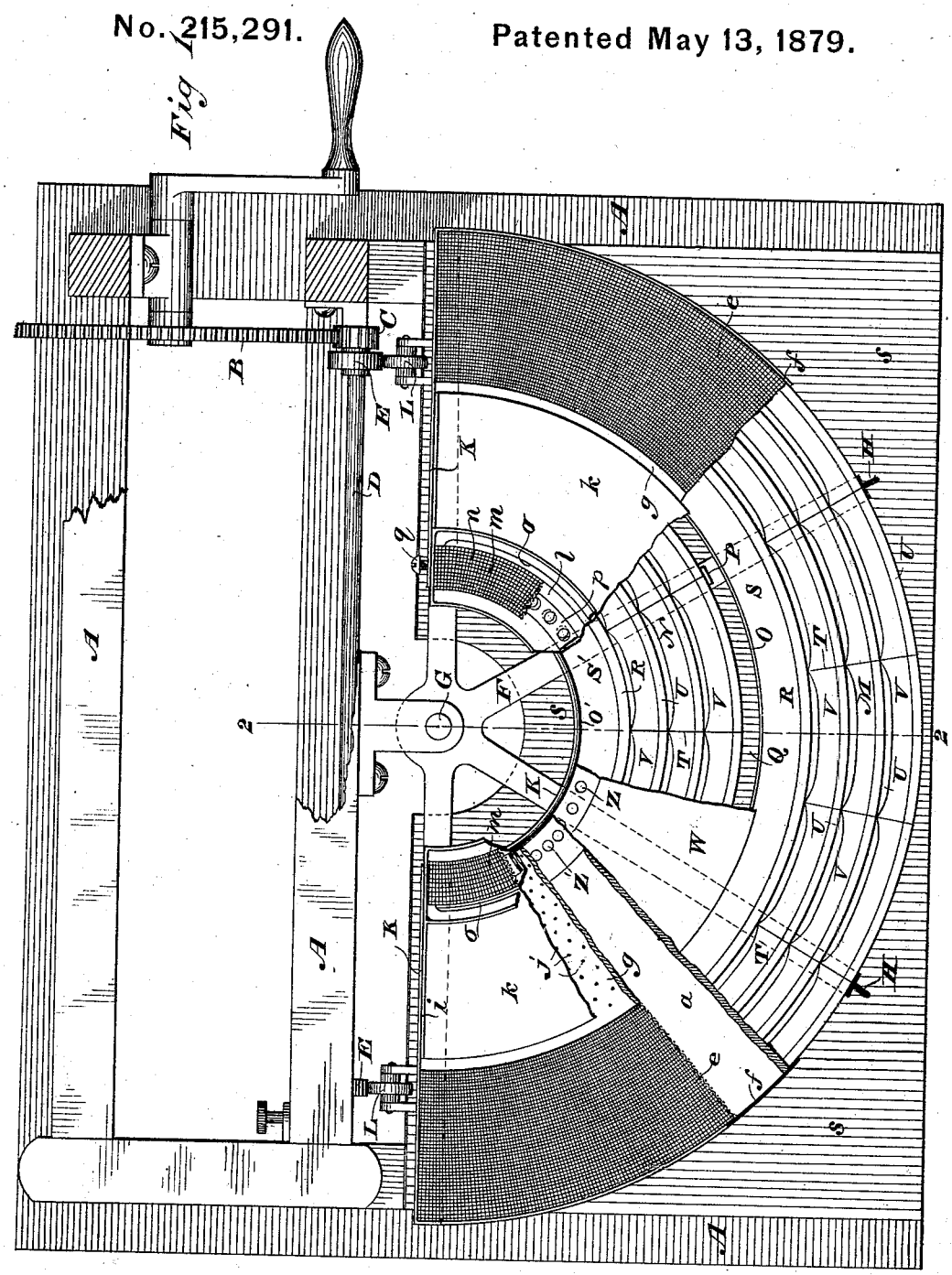
WITNESSES
Wm A Skinkle
Geo N Breck
INVENTOR
Paschal Plant,
By his Attorneys
Baldwin, Hopkins, & Peyton

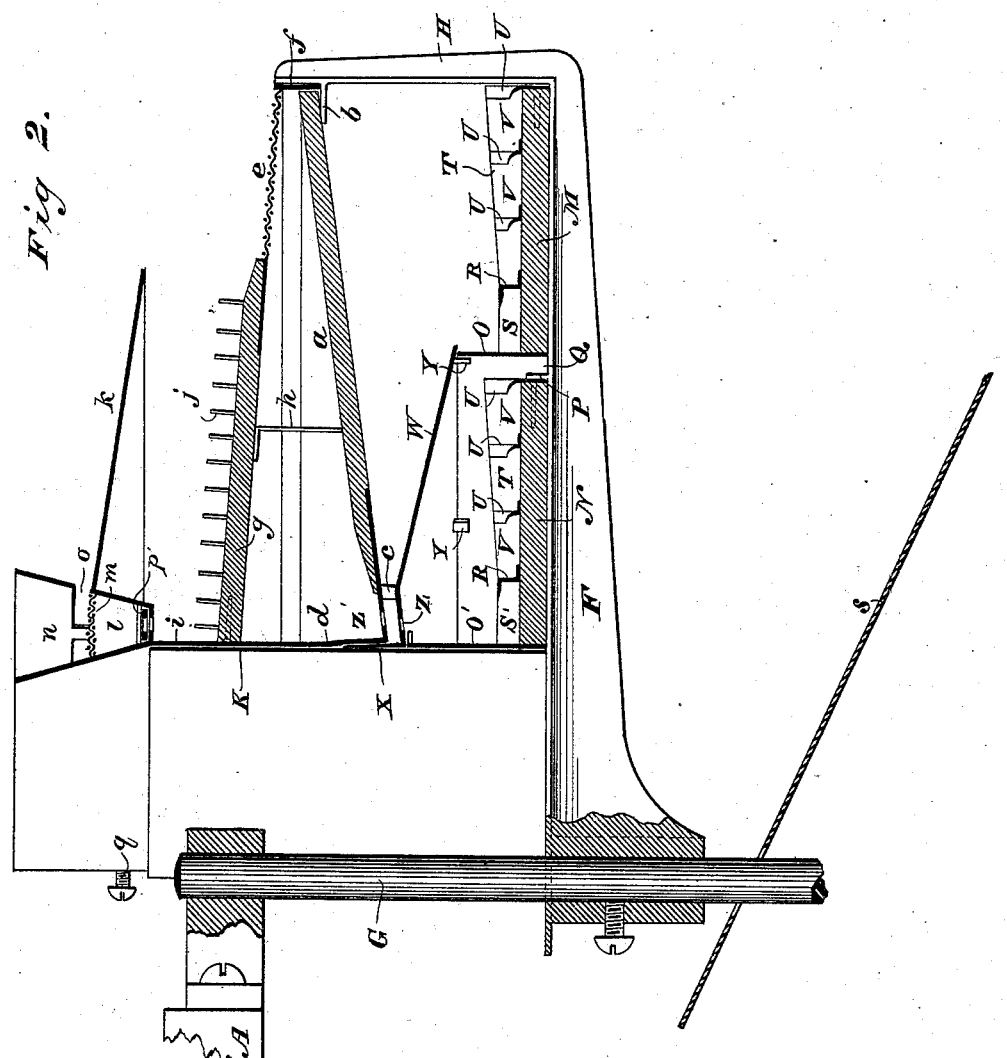

P. PLANT.
Process and Apparatus for Separating Precious Metals from their Ores.
No. 215,291. Patented May 13, 1879.
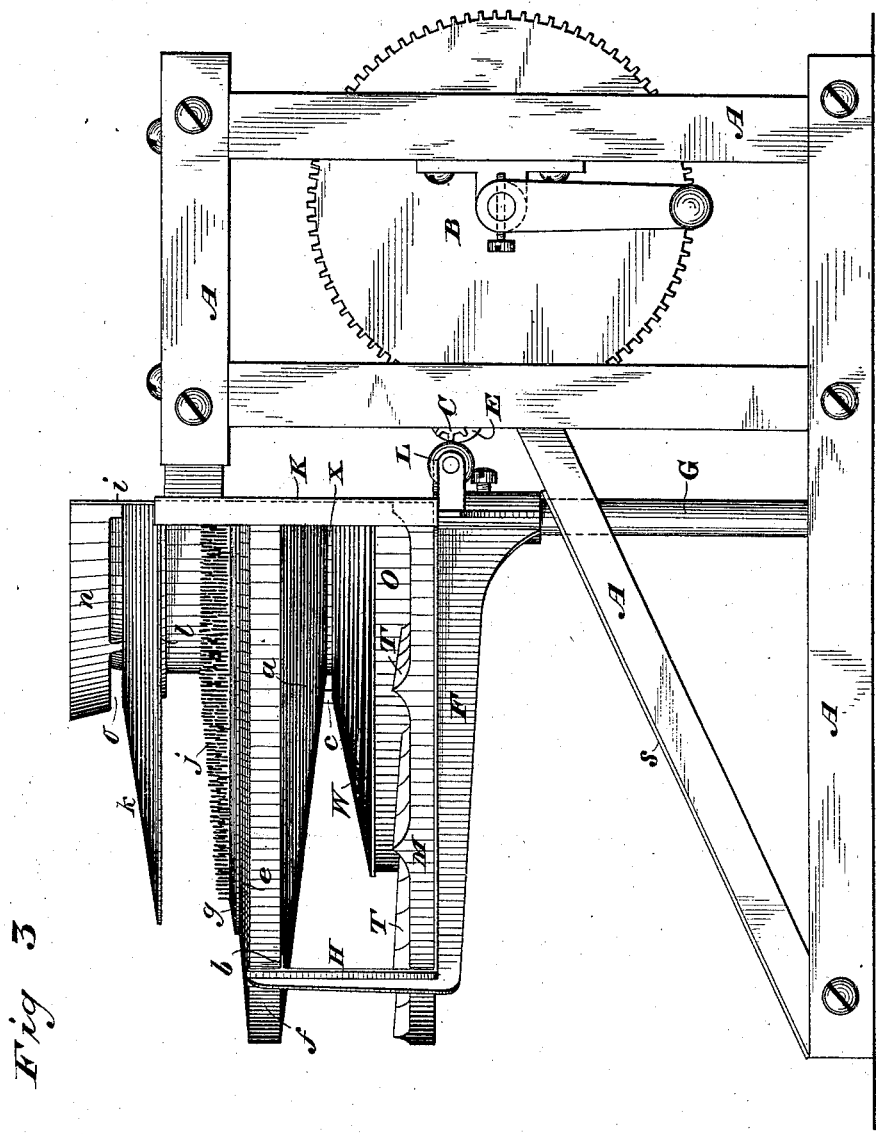

P. PLANT.
Process and Apparatus for Separating Precious Metals from their Ores.

No. 215,291.   Patented May 13, 1879.

11 Sheets—Sheet 4.

WITNESSES
Wm A Skinkle
Geo W Breck

INVENTOR
Paschal Plant.
By his Attorneys
Baldwin, Hopkins, & Peyton.

P. PLANT.
Process and Apparatus for Separating Precious
Metals from their Ores.

No. 215,291. Patented May 13, 1879.

WITNESSES
Wm A Skinkle
Geo W Breck

INVENTOR
Paschal Plant
By his Attorneys
Baldwin, Hopkins & Peyton

11 Sheets—Sheet 6.

P. PLANT.
Process and Apparatus for Separating Precious
Metals from their Ores.

No. 215,291. Patented May 13, 1879.

WITNESSES
Wm. A. Skinkle
Geo. H. Breck.

INVENTOR
Paschal Plant.
By his Attorneys
Baldwin, Hopkins, & Peyton.

P. PLANT.
Process and Apparatus for Separating Precious Metals from their Ores.

11 Sheets—Sheet 7.

No. 215,291. Patented May 13, 1879.

Fig. IV.

WITNESSES
Wm A Skinkle
Geo W Breck

INVENTOR
Paschal Plant,
By his Attorneys
Baldwin, Hopkins, & Peyton.

P. PLANT.
Process and Apparatus for Separating Precious
Metals from their Ores.

No. 215,291. Patented May 13, 1879.

WITNESSES
Wm A Skinkle
Geo W Breck

INVENTOR
Paschal Plant,
By his Attorneys
Baldwin, Hopkins & Peyton

11 Sheets—Sheet 9.

P. PLANT.
Process and Apparatus for Separating Precious Metals from their Ores.

No. 215,291. Patented May 13, 1879.

WITNESSES
Wm. A. Skinkle
Geo. W. Breck.

INVENTOR
Paschal Plant.
By his Attorneys
Baldwin, Hopkins, & Peyton.

P. PLANT.
Process and Apparatus for Separating Precious Metals from their Ores.

No. 215,291. Patented May 13, 1879.

WITNESSES
Wm. A. Skinkle
Geo. W. Breck.

INVENTOR
Paschal Plant
By his Attorneys
Baldwin, Hopkins & Peyton.

UNITED STATES PATENT OFFICE.

PASCHAL PLANT, OF WASHINGTON, DISTRICT OF COLUMBIA.

IMPROVEMENT IN PROCESSES AND APPARATUS FOR SEPARATING PRECIOUS METALS FROM THEIR ORES.

Specification forming part of Letters Patent No. 215,291, dated May 13, 1879; application filed January 24, 1879.

*To all whom it may concern:*

Be it known that I, PASCHAL PLANT, of Washington, in the District of Columbia, have invented certain new and useful Improvements in Methods and Apparatus for Dry-Separating Precious Metals from their Ores, of which the following is a specification.

The principle of my invention is the same as that involved in my United States Letters Patent No. 212,051—that is to say, its successful operation depends upon the observance of the same two peculiar conditions therein set forth, viz., the deposition in suitable receptacles of pulverized ore, ground quartz, or auriferous sand, in very thin layers, and then agitating it there with a rapid tremulous motion, thus effecting separation of the precious metals from the earthy matter, and by a continuation of the operation of my mechanism, owing to its peculiar construction, causing the delivery away of the earthy matter.

The object of my invention is to improve the apparatus shown in my said patent, or to supply other apparatus of a different character, for effectuating the method of dry-separating therein disclosed without the employment of mercury or amalgamators.

Figure 9:
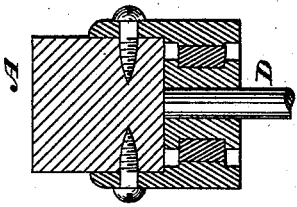
Figure 6:
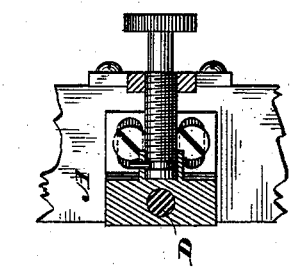
Figure 7:
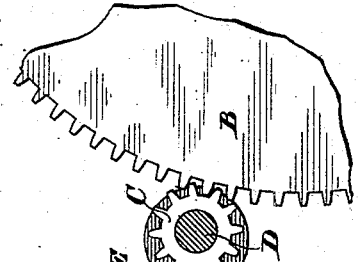
Figure 4:
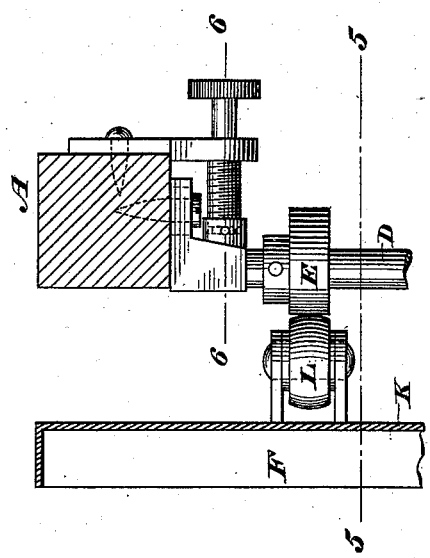
Figure 5:
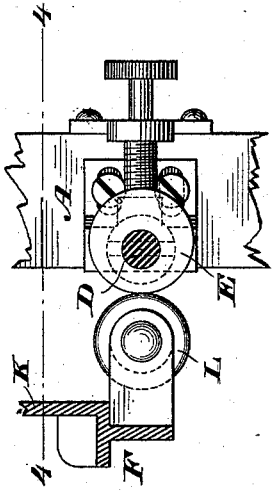
Figure 10:
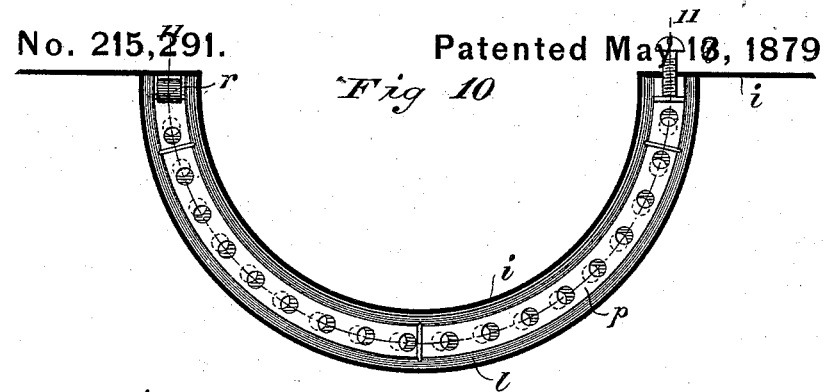
Figure 11:
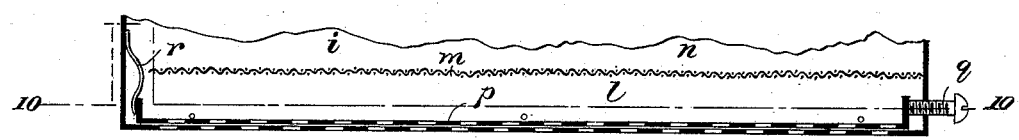
Figure 12:
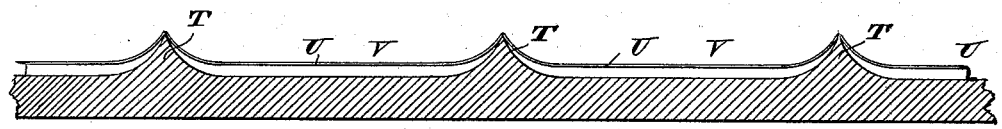
Figure 13:
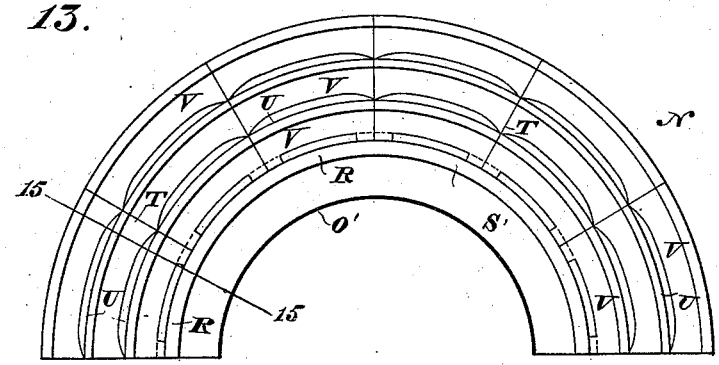
Figure 14:
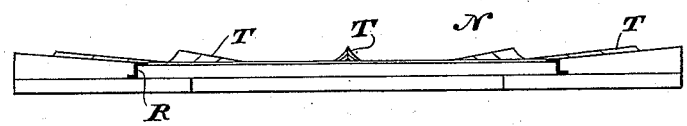
Figure 15:
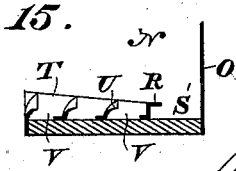
Figure 16:
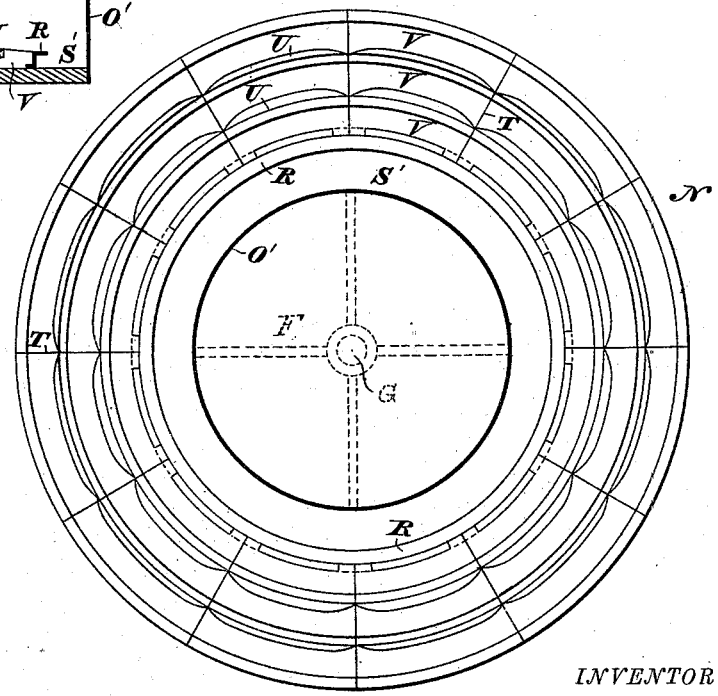
Figure 17:
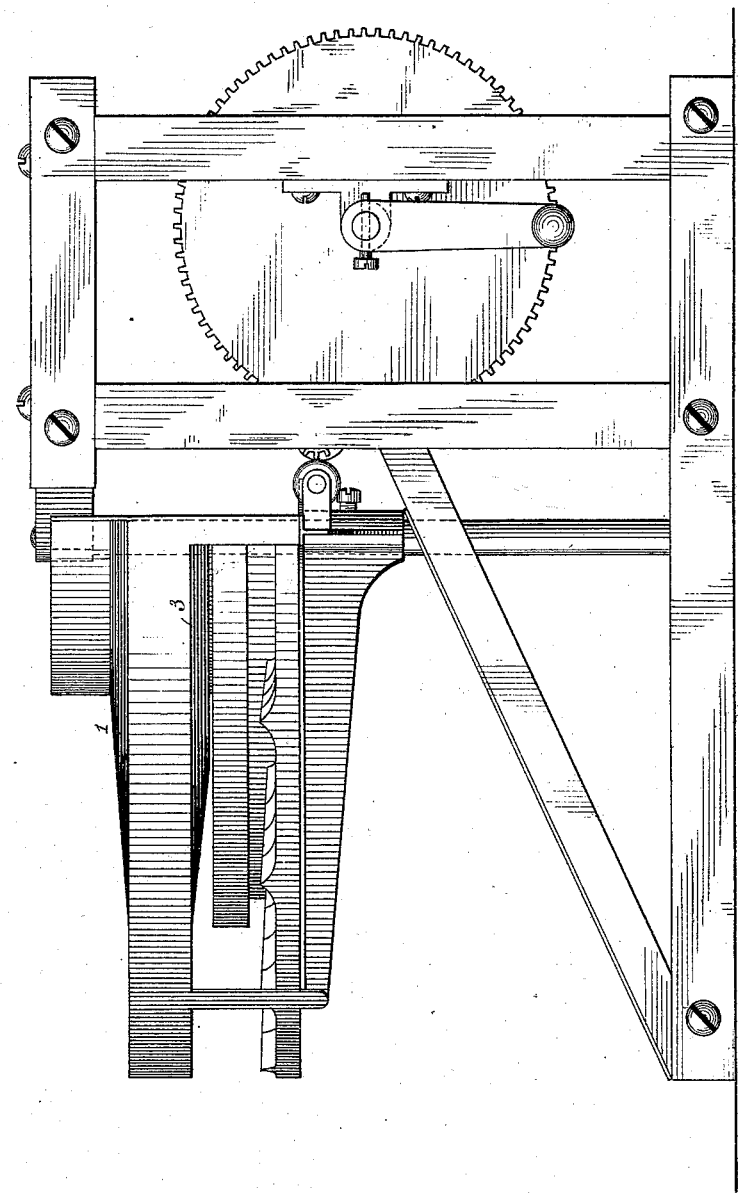
Figure 18:
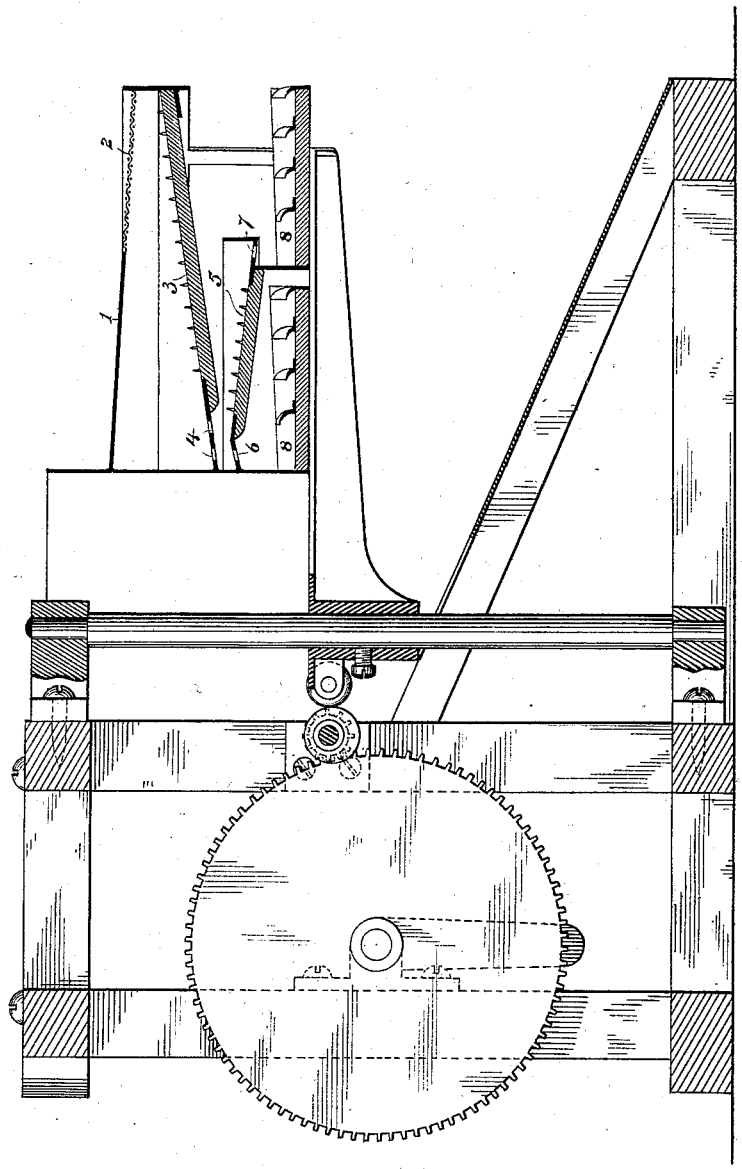
Figure 19:
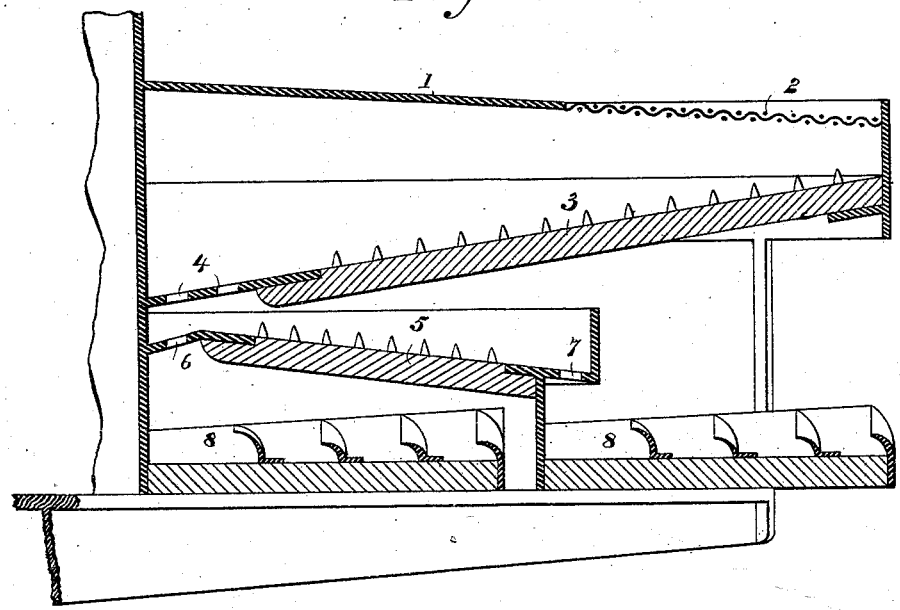
Figure 20:
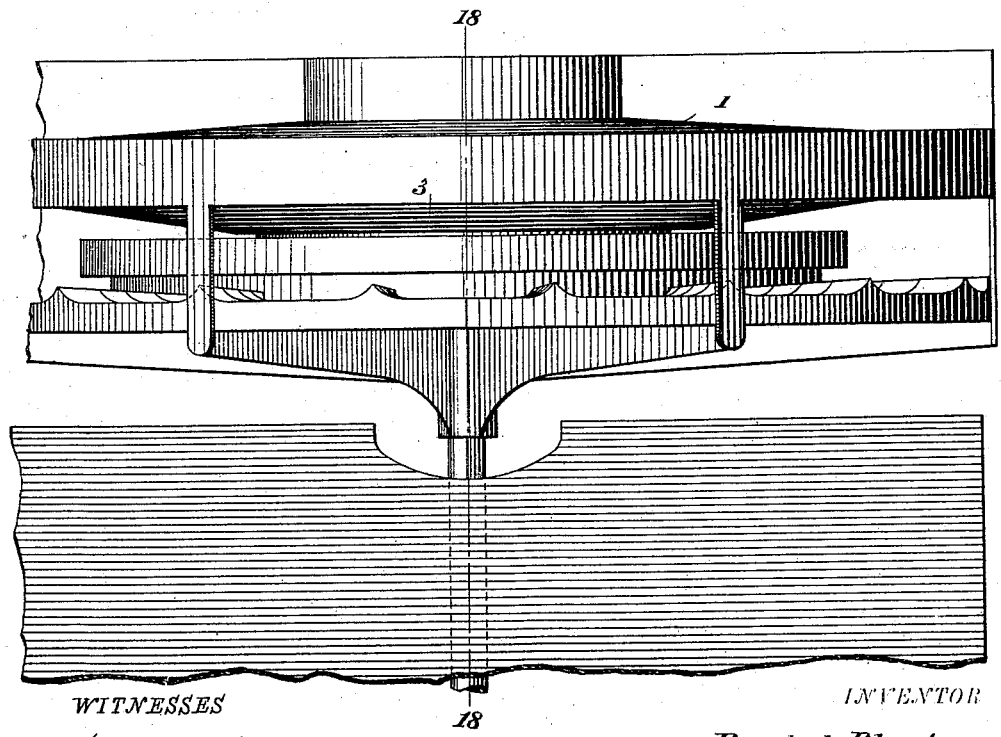
Figure 21:
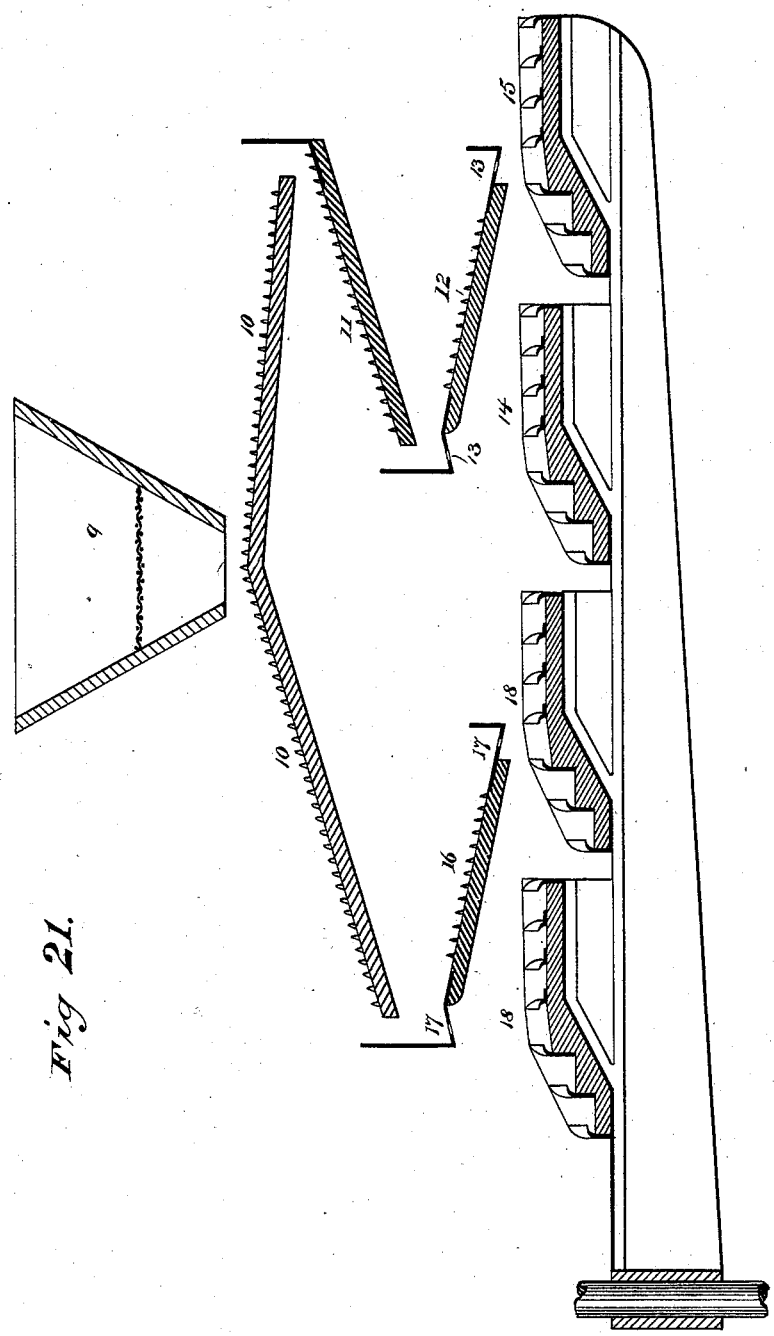
Figure 22:
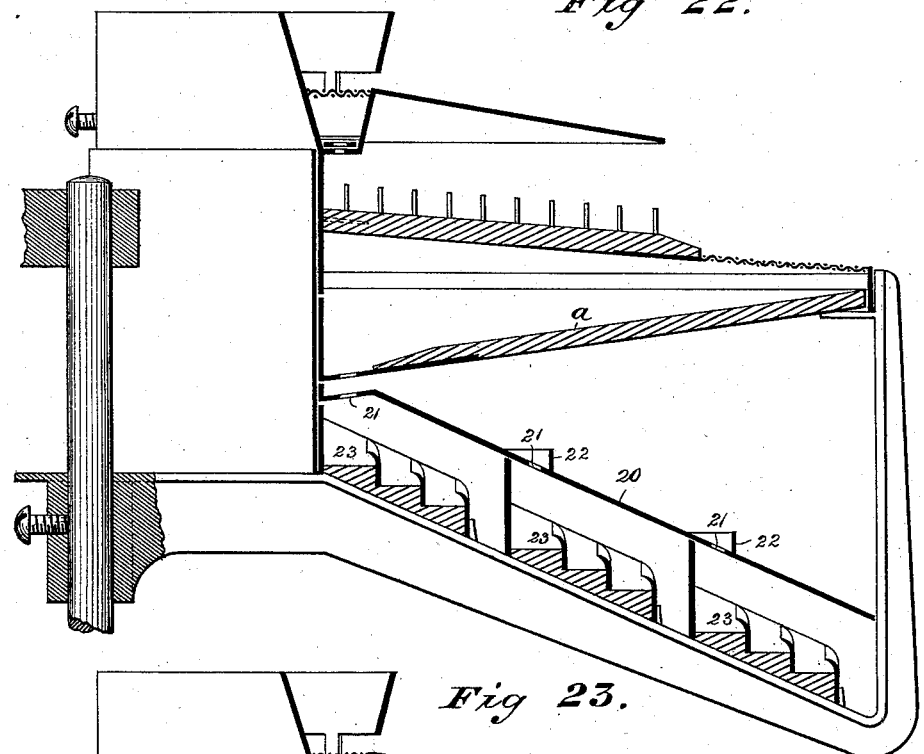
Figure 23:
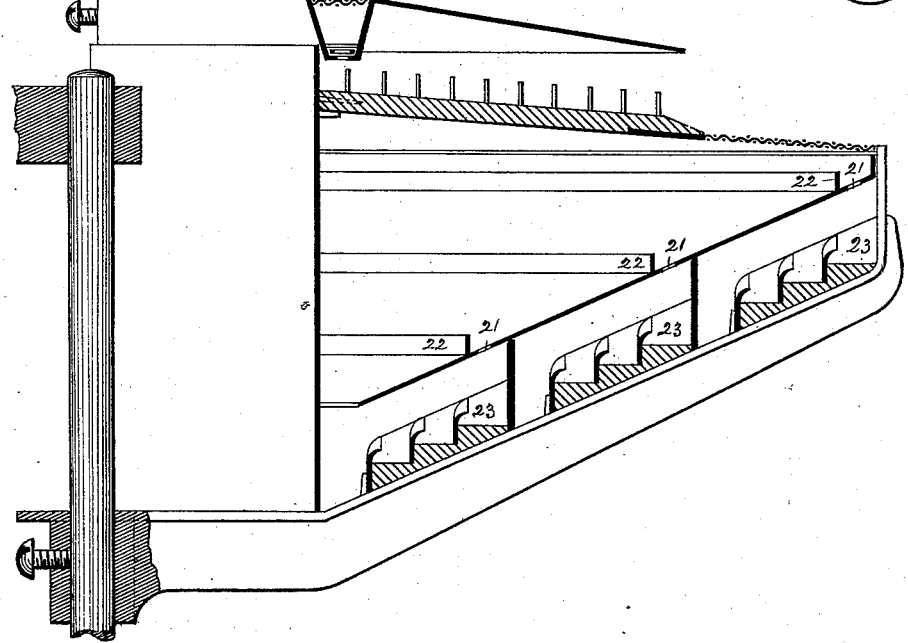

Referring to the accompanying drawings, which illustrate my apparatus, Figure 1 is a plan or top view, partly broken away. Fig. 2 is a sectional elevation through the line 2 2 of Fig. 1. Fig. 3 is a side elevation. Figs. 4, 5, 6, and 7 are detail views in section. Figs. 8 and 9 represent a modification of the details shown in Figs. 4, 5, and 6. Figs. 10 and 11 are details, in section, of the hopper and its feed-regulating mechanism. Fig. 12 is a section of one of the separator-plates. Fig. 13 is a plan view of one of the segmental separator-plates and separators detached. Fig. 14 is a side elevation of the same. Fig. 15 is a cross-section through the line 15 15 of Fig. 13. Fig. 16 is a plan view of a circular separator-plate and separators. Fig. 17 is a side elevation of a slight modification of my apparatus. Fig. 18 is a vertical section of the same on the line 18 18 of Fig. 20. Fig. 19 is a sectional elevation of the same on an enlarged scale. Fig. 20 is a front elevation of the same. Figs. 21, 22, and 23 are sectional elevations of modifications of my apparatus on the same general principle.

Referring to the letters marked on the drawings, A designates the frame of the machine, provided with a main driving-shaft and a spur driving-wheel, B. This wheel gears into a pinion, C, on a cam-shaft, D, carrying near its ends two circular or heart cams, E. All of the separating mechanism is carried by a horizontal semicircular spider-frame, F, secured on a perpendicular rock-shaft, G, resting in suitable bearings on the main frame. This spider-frame is provided at the outer extremities of its radial arms with standards H, and on its straight side, corresponding to the chord of an arc, with a plate, K, curved about its middle. On this straight side are also provided two friction-rollers, L, which bear against the peripheries of the cams before mentioned.

From this description it will be understood that when rotary motion is communicated to the main driving-shaft and driving-wheel the cam-shaft and cams will be revolved, and the spider-frame and all of the separating mechanism carried by it will be rapidly oscillated or agitated.

I have found the employment of heart-cams particularly useful in securing, with smoothness, effectiveness, and proper delicacy, the sort of tremulous agitation desired.

Referring now to my separating mechanism, I may say it consists of certain peculiar feeding, disintegrating, and distributing appliances, combined with certain peculiar separators proper, all of which parts are detachable, and are built up in a pile upon the spider-frame, and, as already stated, are tremulously agitated with it. In the first place, I provide two separate segmental plates, M and N, having on their upper surfaces each a like series of separators. These plates I form preferably of wood, for the reason that the surface of wood is not liable to become so smoothly polished as the surface of metal by the contact of the moving ore, and hence I can get better results by way of agitation, because there will be more friction between the wood surface and the superposed particles of fine ore than between the polished metal surface and the ore. The larger plate, M, rests directly on the spider-arms, bearing at its ends against the plate K, and at its periphery against the standards H, thus being held securely in place. It has on its inner margin a vertical curved flange, O, projecting above its upper surface. The smaller plate, N, also rests directly on the spider-arms, encompassed by the span of the larger plate, but not in contact with it, and it bears at its ends against the plate K, but at its periphery against little vertical lugs P on the spider-arms, thus being held rigidly in place. This plate also has on its inner margin a vertical curved flange, O', projecting upward, and closely fitting against the middle curved portion of the plate K. This disposition of these segmental plates leaves them separated and a free delivery-space between them, as indicated at Q. They are essentially alike in construction, and therefore a description of one of them with its separators will be sufficient. Taking the plate M, for instance, it will be perceived that there is provided, in front of the flange O and coextensive with it, an angular curvilinear partition, R, leaving between it and the flange a space or depository, S, into which, as will presently appear, the fine ore is to be delivered. Beyond this partition R, and extending radially from it to the outer margin of the plate, are numerous inclined or curvilinear sided partitions T. Between these partitions, and connecting them, are several curved cross-partitions, U, substantially concentric with the partition R, but curving from their bases inwardly instead of being angular, like partition R. As it is contemplated sometimes to treat exceedingly fine ore, the partitions R and U are brought to an edge, and they may slightly decrease in height successively to the ou'er ones at the periphery of the plate, if desired; but they are here shown of equal height. These several partitions, it will be observed, form shallow ore receptacles or separators V between them, of which the segment-plate forms the horizontal bottoms. The sides of the radial partitions T, being in the line of direction of the vibrations, and being shaped as described, present no abrupt obstructions to the contained ore, and hence are not liable to cause it to accumulate or bank up, but tend to keep it evenly distributed in the separators, which is important to successful working.

The parts just described as appertaining to the segmental plate M are correspondingly lettered as they appear in the smaller segmental plate, U, except the depository next the flange O', which is lettered S'.

Referring now to the superposed devices by which the ore is prepared, distributed, and delivered into the depositories S and S' of the segmental separator-plates, W designates an outwardly-inclining segmental cap-plate, the periphery of which rests on and is flush with, or may project beyond, the upper edge of the flange O, and its inner side is supported by lugs projecting from the flange O'. This cap-plate has a vertical circular flange, X, around its inner margin, which fits closely around the middle curved portion of the plate K. The ends of the cap-plate bear against the plate K, and it is provided with lugs Y, which bear against the inner side of the flange O, and thus it is held firmly in place. It is also provided with a curved series of perforations, Z, near the flange X.

$a$ designates another segmental cap-plate, which extends out flush with, or it may be slightly beyond, the outer periphery of the separator-plate M. This cap-plate inclines inwardly, and is supported at its periphery by lugs $b$ on the standards H, and at its inner edge by lugs $c$, which rest on the cap-plate W. Its ends bear against the plate K and its periphery against the standards H, and thus it is secured in place. It is provided on its inner margin with a vertical curved flange, $d$, closely fitting the curved middle portion of the plate K, and also with a curved series of perforations, Z', larger than those in the cap-plate W, near the flange $d$.

Immediately above the plate $a$, and flush with its periphery, and secured in place precisely as it is, is a segmental sieve or ore-sifter, $e$, resting at its outer margin on a downwardly-projecting flange, $f$, that rests on the lugs $b$. This sieve is secured at its inner margin to a segmental plate, $g$, provided with lugs $h$, which rest on the plate $a$, for support of the plate $g$ and sieve $e$. The plate $g$ is also provided with a curved upwardly-projecting flange, $i$, which fits around the circular part of the plate K, and extends out on each side as far as the periphery of the plate $g$.

On the upper surface of the plate $g$, which slightly inclines outward, are a multitude of little disintegrating and pulverizing teeth, $j$. Immediately over the plate $g$ is another segmental cap-plate, $k$, with its ends bearing against the flange $i$, and which is secured to the outer edge of a curved trough, $l$, that is perforated at its bottom, and is covered by a sieve, $m$. This sieve forms the bottom of the ore-hopper $n$, which is open on its outside at $o$. Resting on the bottom of the trough $l$ is an adjustable segmental plate, $p$, having perforations coincident with those in the trough-bottom. The purpose of this plate is to open or close, or partially close, at will, the trough-perforations, to regulate the feed of the ore, and this is accomplished by means of a set-screw, $q$, and a spring, $r$; or a set-screw may be used alone by securing it in the end of the plate. All of the parts from $e$ to $r$, inclusive, are so connected as to be all removable together.

From the foregoing description of the structure and arrangement in detail of the parts constituting the pile resting on the spider-frame, their operation, which I will now describe, will readily be comprehended. Supposing the plate $p$ to be suitably adjusted, and the hopper to be filled and continually kept filled, and the agitating mechanism to be in operation, the ore will pass through the hopper-sieve and fall into the trough $l$. Any lumps too large for the sieve will, by the operation of centrifugal force, pass out of the side opening, $o$, over the cap-plate $k$, down onto the sieve e, and thence will be delivered over and fall down onto the inclined waste-plate s.

From the bottom of the trough l the ore will pass through the perforations down onto the toothed plate g, where it will be still further pulverized by the teeth under agitation; thence onto the sieve e, which may be a little finer than the hopper-sieve; thence to the inwardly-inclining cap-plate a, except any coarse particles that may be delivered over the sieve to the waste-plate; thence through the large perforations, Z', down onto the cap-plate W; and thence, in part, down through the small perforations, Z, into the depository S' of the separator-plate N, and in part over the surface of this cap-plate W, down into the depository S of the separator-plate M. As soon as these depositories become filled, the ore begins to flow over the sharp edge of the curved partition R, into the first adjacent series of separators, V; thence over the partitions U to the next series, and so on until the last is reached, when the overflow of earthy matter will fall upon the waste-plate and be conveyed away. The separating operation will begin in the depositories S and S'; but principally large particles of precious metal are likely to be collected there, while most of the finer particles will pass over with the flowing earthy matter, and be collected successively in the separators V.

The utility of having the partitions R and U brought to sharp edges is, that as the ore in the separating-receptacles fills them, and presents itself to these edges and begins to overflow them in very thin streams under the influence of rapid tremulous agitation and the centrifugal force that is thereby generated, they will divide the fine particles of precious metal which may be floating, as it were, like a film near the surface from the earthy matter, and cause them to pass under the edges and down to the bottom, while the lighter earthy matter will ride over. The formation of these sharp edges is therefore of great importance, and constitutes a very marked advance step in the art of dry-separating. Of course the separation is only partial or approximate by the operation of any one separator; but by repeating the operation on the same ore successively several times, thorough separation is very satisfactorily and profitably effected.

It will happen in practice that a tendency will sometimes be manifested in the ore to drift to one side or the other in the separators in the direction of vibration. This is due to the difficulty of maintaining the separators always on a level, and to the difficulty also, even if they were maintained on an exact level, of having the vibratory impulses given them exactly regular and alike. It is necessary to overcome this tendency, and I have therefore provided that one of the journal-boxes of the cam-shaft D shall be delicately adjustable with the adjacent cam toward or away from the adjoining friction-wheel by means of a set-screw, as shown in the different positions in Figs. 4, 5, and 6 so clearly as not to require detailed description. In Figs. 8 and 9 I have illustrated the employment of wedges as substitutes for the set-screw for the adjustment of the box.

The effect of this adjustment of the box to and fro is to cause the adjacent cam to bear loosely or tightly, as desired, against its friction-wheel without appreciably affecting the cam at the other end of the shaft. This varying relation of the cam to the friction-wheel by adjustment is found to effect the vibratory impulses given by the cam in such a manner as to counteract the tendency of the ore in the separators to drift to one side. The operator has only to note when the ore appreciably tends to the right, and then to turn the adjusting-screw to the right, and when it tends to the left, then to turn the adjusting-screw in that direction without stopping the operation of the machine.

I have shown but three separators outside of the partitions R on each of the separator-plates M and N; but it is obvious that more can be employed, if desired.

In order to enlarge the capacity of my apparatus, I contemplate employing similar additional separator-plates with separators outside of the two shown. In this way the machine may be extended to any degree short of that at which the oscillations would have too great amplitude for efficient work at the outside.

I also have in view the employment of several tiers of separators, one above another, feeding all from the same hopper by having different rows of parallel perforations in the bottom of the trough l, with conduit-pipes leading down to different disintegrators or depositories. It will not always be found necessary to employ toothed disintegrating-plates; but they will generally be useful.

These suggested enlargements of my apparatus to increase its working capacity involve no departure, beyond mere addition, from what has already been set forth for the illustration of my invention.

The plan of organization of my apparatus, it will be observed, is such that each distinct nest of separators is intended to deliver over very thin streams of ore, and finally of earthy matter, or, it might be said, one very thin continuous stream, after the machine is in full operation. Hence the operation of each nest will be quite slow; but on that account its work of separating will be the more perfect. While this is true, and while therefore a limited number of these nests would not be sufficient to accomplish a paying amount of work *per diem*, it will be noted that my plan of organization of the apparatus admits of the employment of a very great number of these nests, and thus the slowness of the operation of a single one is compensated for, as it were, and I am enabled to successfully treat a paying quantity of ore.

My present plan of organization admits of a greater multiplication of the number of separators practicable to be employed within working limits than any other known to me, in which fact consists one of its chief points of excellence.

Instead of having my separator-plates segmental or semicircular, as above described, it will be obvious to mechanicians that I may readily construct them circular in form, as represented in Fig. 16. In this case the spider-arm and the superposed feed disintegrating and distributing mechanism would have to be correspondingly constructed.

The agitating mechanism would not require to be materially altered, because it could be applied in the same position that it occupies with respect to the apparatus semicircular in form through suitable modifications in form of the main frame and in position of gearing.

Figs. 17, 18, 19, and 20 exhibit some obvious modifications in arrangement of parts merely for the purposes of illustration, without material departure from the construction and mode of operation herein described, except the omission of a hopper and feed-regulating trough, and the omission of segmental depositories, as distinguished from separators proper, which omitted parts are not essential in all instances.

Referring to these figures, by way of a brief general description, 1 indicates a cap-plate or feed-plate, onto which the pulverized ore may be delivered. 2 indicates a sieve, which is a continuation of the plate 1. 3 indicates an inwardly-inclining disintegrator. 4 indicates delivery-apertures. 5 indicates an outwardly-inclining disintegrator; and 6 and 7 indicate delivery-apertures, through which the ore is deposited into the interior series, 8, of separators proper.

Fig. 21 illustrates a still different arrangement of parts, 9 indicating a sieved hopper; 10, a double-inclined disintegrator; 11, an inwardly-inclined disintegrator; 12, an outwardly-inclined disintegrator; 13 13, delivery-apertures, through which the ore passes to nests of separators 14 and 15; 16, another outwardly-inclining disintegrator; and 17, apertures through which the ore is delivered to nests of separators 18 and 18.

It will be observed that the nests of separators here shown receive the ore in the center, instead of at one side, from which it proceeds in opposite directions—that is to say, outwardly and inwardly to its final overflow. These separators are inclined in the direction of inward delivery, which is to be in opposition to the centrifugal force generated by agitation.

Fig. 22 illustrates another modification, in which the only change from the mechanism first described in detail is in having the separators and spider-arms inclined outwardly, instead of on a horizontal plane. The direct-delivery appliance in this instance is plate 20, which inclines outwardly, and is provided with delivery-apertures 21 and with ledges 22, which latter check the descending ore sufficiently in its passage to cause it to supply the inclined nests of separators 23.

Fig. 23 shows the separators and spider-arms inclining inwardly instead of outwardly, and in other respects is like Fig. 22, with the exception that one cap-plate (designated $a$ in Fig. 22) is omitted.

The figures from 17 to 23, inclusive, I do not describe more minutely in detail, because, in view of the full description of the form of plates first set forth, and in view of the clearness of the drawings, their construction and mode of operation cannot fail to be comprehended, and, besides, these figures show mere modifications in form, which are no essential departure from my invention, but which may be useful to be suggested to all who may desire to use my invention.

Having now described my invention, what I claim as new, and desire to secure by Letters Patent, is—

1. In a machine for dry-separating precious metals from their ores, the combination, substantially as described, of a shallow ore receptacle or separator, having a partition with a thin sharp edge projecting inward, with continuous feed-supply mechanism and mechanism for agitating the separator by a tremulous motion, whereby the earthy matters are made to flow over the sharp-edged projection continuously, while the precious metals are divided from the earthy matters by it, so as to flow under it.

2. The mode of preserving the equal distribution of pulverized ore in thin layers in leveled separators, which consists in regulating the impulses of vibration on opposite sides, substantially as described.

3. The combination of two or more independent nests of separators with a single hopper or initiatory feed-supply and intermediate distributing mechanism for the delivery of the ore separately to the respective nests of separators, substantially as described.

4. The combination of two or more independent nests of separators with a single hopper or initiatory feed-supply, intermediate distributing mechanism for the delivery of the ore separately to the respective nests of separators, and sifting and disintegrating mechanism, substantially as described.

5. A nest of shallow separators provided with radially-inclined or curvilinear-sided partitions T and inclined or curvilinear-edged cross-partitions U, substantially as described.

6. The combination of a wooden separator-plate and the radial and cross partitions T and U, shaped as set forth.

7. The combination of a vibrating spider-frame, provided with standards at the outer ends of the spider-arms, and superposed separate separator-plates carrying nests of separators, substantially as described.

8. The combination of a spider-frame and superposed ore distributing and disintegrating mechanism with agitating mechanism, substantially as described.

9. In a dry-ore-separating apparatus, the combination, with a sieved hopper, of a perforated bottomed trough and an adjustable perforated plate for regulating the feed-supply of ore, substantially as described.

10. The combination of the sieved hopper $n$, provided with side opening, $o$, the cap-plate $k$, the perforated bottomed trough $l$, the disintegrating toothed plate $g$, the sieve $e$, the plate $a$, and the plate W, constructed, arranged, and operating substantially as described.

In testimony whereof I have hereunto subscribed my name.

PASCHAL PLANT.

Witnesses:
WM. J. PEYTON,
G. H. MAYNADIER.